United States Patent
Gage et al.

(10) Patent No.: US 10,421,436 B2
(45) Date of Patent: Sep. 24, 2019

(54) SYSTEMS AND METHODS FOR SURVEILLANCE OF A VEHICLE USING CAMERA IMAGES

(71) Applicants: Toyota Motor Engineering & Manufacturing North America, Inc., Erlanger, KY (US); DENSO International America Inc., Southfield, MI (US)

(72) Inventors: Sergei I. Gage, Redford, MI (US); Jay Robert Gloomis, Ann Arbor, MI (US); Isabel Rios, Dearborn Heights, MI (US)

(73) Assignees: Toyota Motor Engineering & Manufacturing North America, Inc., Plano, TX (US); DENSO International America Inc., Southfield, MI (US)

( * ) Notice: Subject to any disclaimer, the term of this patent is extended or adjusted under 35 U.S.C. 154(b) by 82 days.

(21) Appl. No.: 15/468,213

(22) Filed: Mar. 24, 2017

(65) Prior Publication Data
US 2018/0272992 A1 Sep. 27, 2018

(51) Int. Cl.
*B60R 25/30* (2013.01)
*B60R 1/00* (2006.01)
*B60R 25/102* (2013.01)
*G06K 9/00* (2006.01)
*G06N 20/00* (2019.01)

(52) U.S. Cl.
CPC ............. *B60R 25/305* (2013.01); *B60R 1/00* (2013.01); *B60R 25/102* (2013.01); *G06K 9/00771* (2013.01); *G06K 9/00791* (2013.01); *G06K 9/00979* (2013.01); *G06N 20/00* (2019.01); *B60R 2300/307* (2013.01); *B60R 2300/8073* (2013.01)

(58) Field of Classification Search
CPC .......... B60R 25/305; B60R 25/10–104; B60R 25/30; B60R 1/00; B60R 2300/8073; B60R 2300/307; G06N 20/00; G06K 9/00771; G06K 9/00791; G06K 9/00979; G06K 9/00805; G06K 9/00845
See application file for complete search history.

(56) References Cited

U.S. PATENT DOCUMENTS

| | | | | |
|---|---|---|---|---|
| 5,931,547 A | * | 8/1999 | Lerner | B60T 7/22 303/193 |
| 6,327,536 B1 | * | 12/2001 | Tsuji | B60Q 9/008 340/435 |
| 7,130,745 B2 | * | 10/2006 | Sherony | G01S 11/12 701/301 |
| 7,579,942 B2 | * | 8/2009 | Kalik | B60Q 9/00 340/425.5 |

(Continued)

*Primary Examiner* — Michael S Osinski
(74) *Attorney, Agent, or Firm* — Christopher G. Darrow; Darrow Mustafa PC (57) ABSTRACT

System, methods, and other embodiments described herein relate to surveillance of a vehicle. In one embodiment, a method includes, in response to detecting a surveillance event associated with the vehicle, collecting information from one or more sensors of the vehicle about the surveillance event. The method includes classifying the information according to a security profile to identify a threat type and a threat level of the surveillance event. The method includes controlling the vehicle to provide a response to the surveillance event according to the threat type and the threat level.

20 Claims, 6 Drawing Sheets

(56) References Cited

U.S. PATENT DOCUMENTS

| | | | |
|---|---|---|---|
| 7,925,441 B2* | 4/2011 | Maemura | B60T 7/22 340/435 |
| 8,019,122 B2 | 9/2011 | Zou et al. | |
| 8,471,692 B2* | 6/2013 | Yano | B60K 31/0008 340/435 |
| 9,143,843 B2* | 9/2015 | De Luca | G08B 21/12 |
| 9,298,575 B2* | 3/2016 | Tamari | G06F 11/3013 |
| 9,387,824 B2 | 7/2016 | Pisz et al. | |
| 9,429,946 B2* | 8/2016 | Chen | G05D 1/0214 |
| 9,583,004 B2* | 2/2017 | Lovitt | B60Q 9/008 |
| 9,672,744 B2* | 6/2017 | Ignaczak | G08G 1/166 |
| 9,809,196 B1* | 11/2017 | Penilla | H04N 7/181 |
| 9,836,056 B2* | 12/2017 | Ansari | G05D 1/0212 |
| 9,849,865 B2* | 12/2017 | Kwon | B60T 8/171 |
| 9,852,632 B2* | 12/2017 | Sempuku | G08G 1/165 |
| 9,895,974 B2* | 2/2018 | Watanabe | B60K 35/00 |
| 9,903,733 B2* | 2/2018 | Bai | G01C 21/36 |
| 9,932,033 B2* | 4/2018 | Slusar | B60W 30/143 |
| 9,947,149 B2* | 4/2018 | Bonhomme | G08G 1/0967 |
| 9,965,956 B2* | 5/2018 | Tsushima | G08G 1/16 |
| 9,969,329 B2* | 5/2018 | Shenoy | B60Q 9/008 |
| 9,988,055 B1* | 6/2018 | O'Flaherty | H04W 4/90 |
| 10,005,414 B2* | 6/2018 | Kim | B60K 31/0008 |
| 10,007,854 B2* | 6/2018 | Blayvas | G06K 9/00805 |
| 10,019,009 B2* | 7/2018 | Chintakindi | B60T 7/18 |
| 2004/0107033 A1* | 6/2004 | Rao | B60R 21/013 701/45 |
| 2006/0235615 A1* | 10/2006 | Kato | B60W 40/04 701/300 |
| 2006/0250501 A1 | 11/2006 | Widmann et al. | |
| 2007/0286456 A1 | 12/2007 | Ariyur et al. | |
| 2010/0063736 A1* | 3/2010 | Hoetzer | B60W 30/09 701/301 |
| 2011/0261202 A1* | 10/2011 | Goldstein | G08B 13/19602 348/149 |
| 2012/0162423 A1 | 6/2012 | Xiao et al. | |
| 2013/0096731 A1* | 4/2013 | Tamari | G06F 11/3013 701/1 |
| 2013/0321628 A1* | 12/2013 | Eng | B60R 1/00 348/148 |
| 2014/0118144 A1* | 5/2014 | Amis | G08B 21/02 340/540 |
| 2015/0015712 A1* | 1/2015 | Sempuku | G08G 1/165 348/148 |
| 2015/0166059 A1* | 6/2015 | Ko | B60W 30/09 701/28 |
| 2015/0348417 A1* | 12/2015 | Ignaczak | G08G 1/166 340/435 |
| 2016/0082978 A1* | 3/2016 | Ozaki | G01C 21/34 701/58 |
| 2016/0150070 A1* | 5/2016 | Goren | H04W 4/029 455/404.2 |
| 2016/0167652 A1* | 6/2016 | Slusar | B60W 30/143 701/27 |
| 2016/0187880 A1* | 6/2016 | Chen | G05D 1/0214 701/27 |
| 2016/0275730 A1* | 9/2016 | Bonhomme | G08G 1/0967 |
| 2017/0072851 A1* | 3/2017 | Shenoy | B60Q 9/008 |
| 2017/0166172 A1* | 6/2017 | Kwon | B60T 7/22 |
| 2017/0186319 A1* | 6/2017 | Tsushima | G08G 1/16 |
| 2017/0248953 A1* | 8/2017 | Kelley | B62D 15/0265 |
| 2017/0259815 A1* | 9/2017 | Shaker | B60R 21/013 |
| 2017/0263061 A1* | 9/2017 | Mann | G07C 5/0808 |
| 2017/0268896 A1* | 9/2017 | Bai | G01C 21/36 |
| 2017/0330397 A1* | 11/2017 | Palmer | B60R 1/00 |
| 2017/0361796 A1* | 12/2017 | Kim | B60K 31/0008 |
| 2017/0364080 A1* | 12/2017 | Chintakindi | B60T 7/18 |
| 2018/0012085 A1* | 1/2018 | Blayvas | G06K 9/00805 |
| 2018/0037193 A1* | 2/2018 | Penilla | H04N 7/181 |
| 2018/0086264 A1* | 3/2018 | Pedersen | G08G 1/0116 |
| 2018/0218549 A1* | 8/2018 | Wahba | B60R 21/00 |
| 2018/0225976 A1* | 8/2018 | Rinehart | G08G 5/003 |
| 2018/0238701 A1* | 8/2018 | Liebinger | G01C 21/3626 |

\* cited by examiner

SYSTEMS AND METHODS FOR SURVEILLANCE OF A VEHICLE USING CAMERA IMAGES

TECHNICAL FIELD

The subject matter described herein relates in general to systems for providing remote camera surveillance of a vehicle and, more particularly, to using image recognition techniques in combination with cameras integrated with the vehicle to recognize aspects of different events to coordinate a proportional response.

BACKGROUND

Vehicle security generally uses different sensors (e.g., proximity, shock, etc.) to detect different types of events that commonly correlate with attempts to break into a vehicle or otherwise effect the security of the vehicle. For example, a door sensor actuates when a door handle is activated, while a shock sensor may actuate when an impact against the vehicle occurs. Thus, the vehicle detects the various events passively and automatically assumes the events are security risks resulting in, for example, activation of an audible alarm. However, this approach may lead to false alarms and also does not actively deter security risks since the alarm is only provided after the occurrence of the event.

For example, while an action of attempting to open the door to the vehicle may correlate with an illicit attempt to gain entry into the vehicle, this action may also correspond to a child or other person mindlessly touching the door handle with no malicious intent. Moreover, while contact with the vehicle by an intruder is an event of concern, a passerby accidentally brushing against the vehicle, inanimate objects bumping into the vehicle, and many other harmless actions can still register with various sensors causing the system to activate an alarm. This sensitivity to events that are not security risks can lead to false alarms and thus may degrade a response when an actual security event does occur.

SUMMARY

An example of a surveillance system that actively classifies security risks and responds proportionally to the security risks is presented herein. In one embodiment, the surveillance system uses a plurality of sensors to detect surveillance events in a surrounding environment of the vehicle and to assess a threat type and a threat level associated with the surveillance events. Accordingly, the surveillance system can actively monitor inputs from the sensors to detect surveillance events that correlate with risks to the vehicle instead of blindly initiating an alarm whenever a sensor is activated.

In one embodiment, the surveillance system accomplishes providing a proportional response by first undertaking an additional assessment whenever a sensor is activated. That is, instead of immediately activating an alarm whenever a shock sensor or other sensor is actuated, the surveillance system detects the activation of the shock sensor and, for example, obtains further information that can be used to qualify the event. As one example, the surveillance system collects images from cameras mounted in or on the vehicle and classifies the collected information according to a threat type and a threat level. In one embodiment, the surveillance system collects the images and analyzes the images according to one or more image recognition techniques to identify objects within the images. Thus, the surveillance system, upon identifying from the images whether the object is a person, a vehicle, or another object, can determine a threat type. Thereafter, the surveillance system correlates the threat type with a security profile to determine the threat level and an appropriate response. Consequently, the surveillance system can use the threat type and threat level to provide a proportional response such as notifying a remote device, activating an audible alarm or simply logging information (e.g., storing the images). Thus, the surveillance system actively analyzes aspects of surveillance events to provide a proportional response.

In one embodiment, a surveillance system for providing security for a vehicle is disclosed. The surveillance system includes one or more processors and a memory that is communicably coupled to the one or more processors. The memory stores a monitoring module that includes instructions that when executed by the one or more processors cause the one or more processors to, in response to detecting a surveillance event associated with the vehicle, collect information from one or more sensors of the vehicle about the surveillance event. The memory stores a response module that includes instructions that when executed by the one or more processors cause the one or more processors to classify the information according to a security profile to identify a threat type and a threat level of the surveillance event. The response module includes instructions to control the vehicle to provide a response to the surveillance event according to the threat type and the threat level.

In one embodiment, a non-transitory computer-readable medium is disclosed. The computer-readable medium stores instructions that when executed by one or more processors cause the one or more processors to perform the disclosed functions. The instructions include instructions to, in response to detecting a surveillance event associated with the vehicle, collect information from one or more sensors of the vehicle about the surveillance event. The instructions include instructions to classify the information according to a security profile to identify a threat type and a threat level of the surveillance event. The instructions include instructions to control the vehicle to provide a response to the surveillance event according to the threat type and the threat level.

In one embodiment, a method of providing security for a vehicle is disclosed. The method includes, in response to detecting a surveillance event associated with the vehicle, collecting information from one or more sensors of the vehicle about the surveillance event. The method includes classifying the information according to a security profile to identify a threat type and a threat level of the surveillance event. The method includes controlling the vehicle to provide a response to the surveillance event according to the threat type and the threat level.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with classifying surveillance events to provide a correlated response to the events are disclosed. As mentioned in the background, a vehicle can include various sensors, that are part of a security system or another vehicle system. The sensors are generally activated when an input for which the respective sensor is configured occurs. That is, when a door handle is actuated, a door handle sensor and/or shock sensor is activated, when a window is broken a glass break sensor is activated, and so on. However, as previously mentioned, these sensors provide simple feedback that indicates, for example, just whether the activating input was present. In other words, the sensors provide a type of feedback that is agnostic to whether the source is deserving of a security response or not. As a result, providing an appropriate response can be difficult and, thus, results in false alarms or failure to initiate an alarm when an event does warrant such a response.

Therefore, in one embodiment, the surveillance system uses a plurality of sensors including one or more cameras to detect surveillance events in a surrounding environment of the vehicle. Moreover, the surveillance system uses the suite of sensors to gather information about the surveillance events so that aspects of the surveillance events can be characterized and an appropriate response can then be provided. Thus, the surveillance system monitors inputs from the sensors and gathers additional information when certain sensor inputs are identified to detect surveillance events that correlate with potential risks to the vehicle. Accordingly, instead of immediately activating an alarm whenever a sensor input is received, the surveillance system qualifies the sensor input according to additional information and a classification of the information so that a proportional response can be provided.

For example, in one embodiment, the surveillance system detects an input from one of the sensors that correlates with a defined surveillance event. Thereafter, the surveillance system collects additional information about the surveillance event and proceeds to classify the collected information according to a threat type and a threat level. That is, the surveillance system determines whether characteristics of the surveillance event represent a security risk to the vehicle by further gathering information and classifying that information. In one embodiment, the surveillance system collects images of the surrounding environment of the vehicle in order to identify the threat type and threat level. Consequently, the surveillance system can use the threat type and threat level to determine and provide a proportional response such as notifying a remote device, activating an audible alarm or simply logging information (e.g., storing the images).

Figure 1:
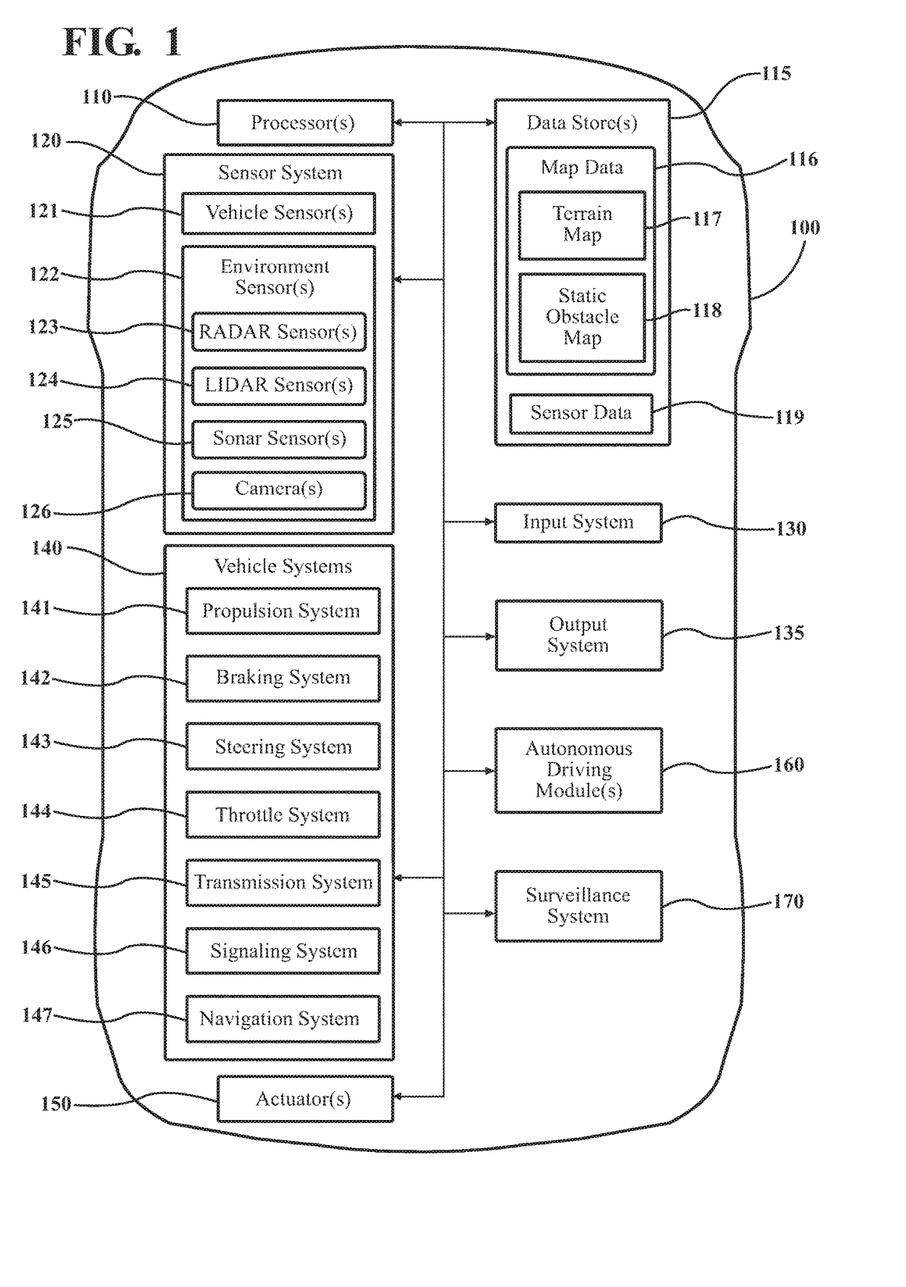
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that includes the noted sensors and thus benefits from an intelligent response to sensor inputs.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a surveillance system 170 that is implemented to perform methods and other functions as disclosed herein relating to monitoring for surveillance events, collecting information about surveillance events when they occur, and analyzing the gathered information to provide a proportional response. The noted functions and methods will become more apparent with a further discussion of the figures.

Figure 2:
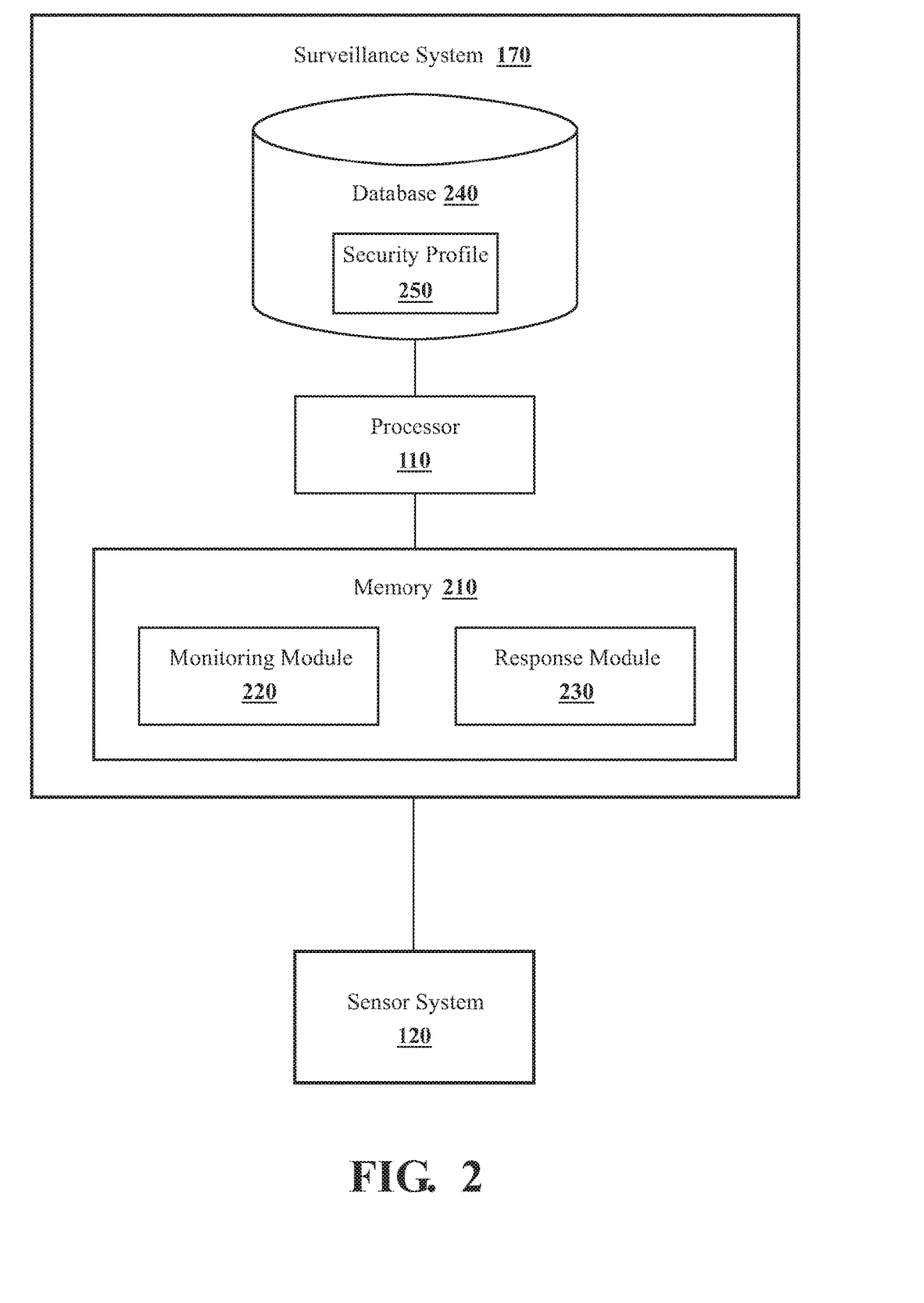
FIG. 2 illustrates one embodiment of a surveillance system that is associated with classifying surveillance events to provide a correlated response.

With reference to FIG. 2, one embodiment of the surveillance system 170 of FIG. 1 is further illustrated. The surveillance system 170 is shown as including the processor 110 from the vehicle 100 of FIG. 1. Accordingly, the processor 110 may be a part of the surveillance system 170, the surveillance system 170 may include a separate processor from the processor 110 of the vehicle 100 or the surveillance system 170 may access the processor 110 through a data bus or another communication path. In one embodiment, the surveillance system 170 includes a memory 210 that stores a monitoring module 220 and a response module 230. The memory 210 is a random-access memory (RAM), read-only memory (ROM), a hard-disk drive, a flash memory, a distributed memory, a cloud-based memory, or other suitable memory for storing the modules 220 and 230. The modules 220 and 230 are, for example, computer-readable instructions that when executed by the processor 110 cause the processor 110 to perform the various functions disclosed herein.

Accordingly, the monitoring module 220 generally includes instructions that function to control the processor 110 to monitor inputs from one or more sensors of the sensor system 120 to detect surveillance events. The surveillance events are, for example, events that occur within a proximity to the vehicle 100 that may impact the security of the vehicle 100. For example, the surveillance event can be actuation of a shock sensor, a proximity sensor, a glass break sensor, a sensor from a key of the vehicle 100, a tire pressure sensor, a gas cap sensor, or another sensor of the sensor system 120 or the vehicle systems 140. Moreover, in one embodiment, the monitoring module 220 can also monitor a wireless network interface card or another communications device for alert signals from nearby sources such as a nearby vehicle or static security system to detect a surveillance event.

Accordingly, the monitoring module 220 can monitor a data bus or other communication pathway for signals provided by one or more of the sensors. In one embodiment, the monitoring module 220 monitors for a signal from one of the sensors or for multiple signals that can be from a single one of the sensors or from multiple independent sensors. In either case, the combinations of sensor activation inputs that are considered to constitute a surveillance event are defined, in one embodiment, by the security profile 250, which will be discussed in greater detail subsequently.

Once the monitoring module 220 receives inputs from one or more of the sensors and determines that the inputs correlate with a surveillance event as defined by the security profile 250, the monitoring module 220 proceeds by collecting additional information so that the surveillance event can be further analyzed. In one embodiment, the monitoring module 220 collects additional information from one or more of the cameras 126. For example, the vehicle 100 can be equipped with multiple cameras 126 that provide external views and/or internal views of the vehicle 100. In one embodiment, the cameras 126 are mounted to the vehicle 100 in a manner to provide a complete 360-view of an environment surrounding the vehicle 100.

Moreover, in one embodiment, the vehicle 100 also includes one or more cameras inside, which the monitoring module 220 can activate to gather images and/or video. For example, the vehicle 100 can include driver status monitoring cameras pointing in a general direction of where a driver is expected to be viewable, rear compartment cameras with a field of view encompassing rear passenger seating areas, and so on. While the monitoring module 220 is generally discussed as collecting information from cameras to further investigate the surveillance event, in various embodiments, information can be acquired from generally any sensors in the vehicle 100 or from nearby sources such as nearby surveillance cameras that can communicate images to the vehicle 100. In either case, the monitoring module 220 collects images from an area around and/or in the vehicle 100 that include one or more objects which may be a source of the surveillance event.

In one embodiment, the response module 230 includes instructions that function to control the processor 110 to classify a threat type and a threat level associated with the surveillance event using the collected information. For example, the response module 230 uses the images from the cameras 126 to identify one or more objects. That is, the response module 230 analyzes the images using one or more object recognition techniques to identify types of objects (e.g., vehicle, person, ball, etc.), locations of objects (e.g., proximate to the vehicle 100, moving away from the vehicle 100), poses of objects (e.g., holding a weapon, facing away, etc.). Thus, the response module 230 can use the images collected by the monitoring module 220 to ascertain characteristics of the surroundings. In further examples, the response module 230 can identify a particular person, vehicle or other object according to biometrics or other identifying features that are stored in or otherwise indicated by the security profile 250. However, in general, the response module 230 determines a threat type by generically determining a type of the object and other general aspects such as a proximity, speed of movement, and so on.

With continued reference to the surveillance system 170, in one embodiment, the system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various determinations.

In one embodiment, the database 240 stores the security profile 250. Alternatively, the surveillance system 170 stores the security profile 250 in the memory 210, a specialized data structure (e.g., look-up table, etc.), a cache memory, or another suitable data storage component. The security profile 250 is a table or other data structure that indicates different criteria for identifying surveillance events and classifying threat types and levels. Thus, it should be appreciated that the particular configuration of the security profile 250 can differ according to preferences associated with a particular implementation and/or owner. In either case, the security profile 250 generally includes a table that correlates threat types to threat levels and responses that can be provided.

In one embodiment, the security profile 250 includes a separate table for each different threat type in order to provide a fine granularity of possible responses. For example, once the response module 230 identifies the threat type, a further analysis ensues that correlates aspects of the threat type with further information including which sensors were initially activated, whether the sensors remain active, additional sensors that have been activated, information obtained from nearby sources, and so on. According to this assessment, for example, a threat level is determined that can be used as input to the security profile to identify a particular response. For example, the threat level is selected from low, marginal, or severe as a function of the particular threat type and characteristics of the threat type as noted.

In one embodiment, when the threat type indicates the presence of a person and the threat level is determined to marginal, then the response module 230 may identify a response from the security profile 250 that is to log information about the event, a threat level of marginal may indicate that the response module 230 is to provide an indication to a remote device in the form images from the cameras 126, whereas a threat level of severe indicates that the response module 230 is to sound an audible alarm and provide a communication to police. In this way, the surveillance system 170 provides for qualifying sensor inputs for various surveillance events to provide a proportional response. In further aspects, the response module 230 can provide an indication to the remote device to cause the remote device to display images from the cameras 126 along with, for example, additional information about the surveillance event. Thereafter, the response module 230 can receive electronic instructions from the remote device that indicate a further response. For example, the further response can include escalating an alarm, deactivating an alarm, providing audio from the remote device, and so on.

Figure 3:
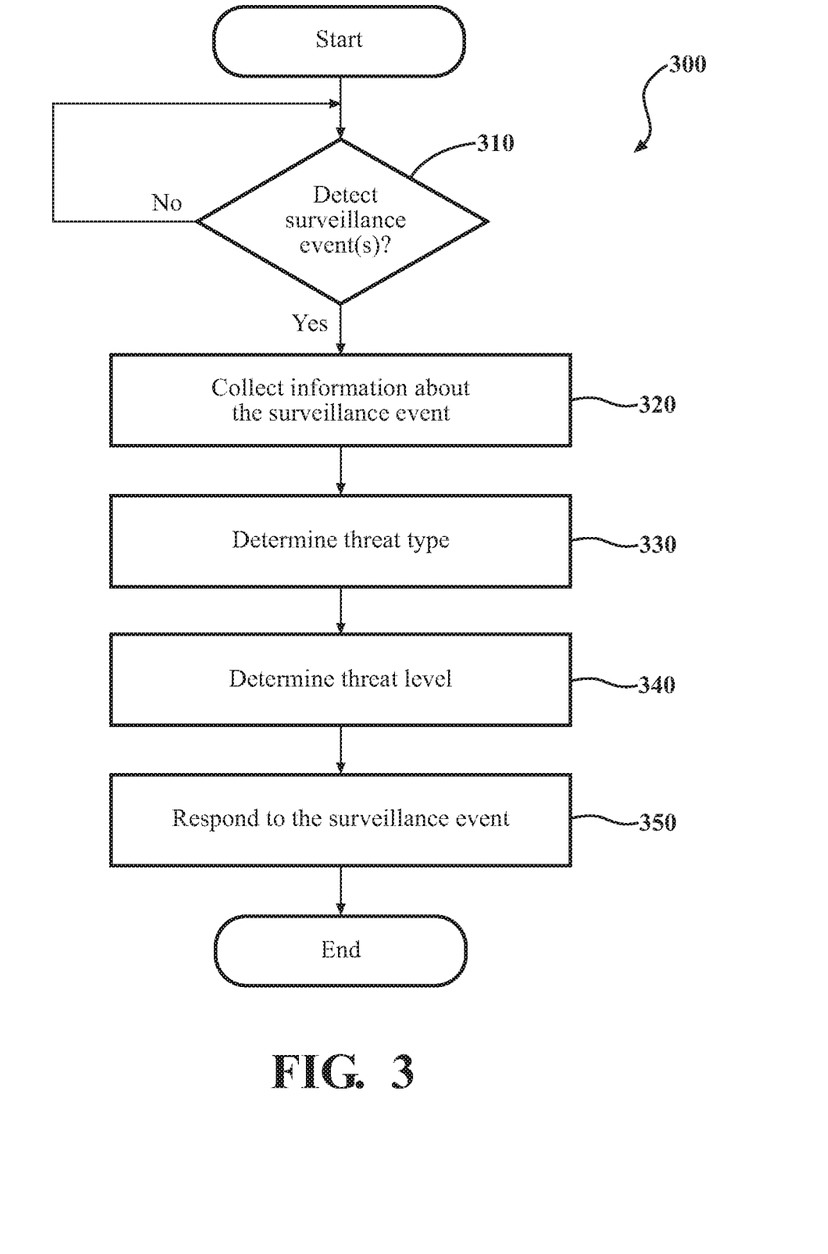
FIG. 3 illustrates one embodiment of a method that is associated with assessing surveillance events according to threat types and threat levels.

Additional aspects of classifying a surveillance event according to a threat type and a threat level will be discussed in relation to FIG. 3. FIG. 3 illustrates a method 300 associated with classifying a threat upon detecting a surveillance event and providing a response. Method 300 will be discussed from the perspective of the surveillance system 170 of FIGS. 1 and 2. While method 300 is discussed in combination with the surveillance system 170, it should be appreciated that the method 300 is not limited to being implemented within the surveillance system 170, but is instead one example of a system that may implement the method 300.

At 310, the monitoring module 220 detects a surveillance event associated with the vehicle 100. In one embodiment, the monitoring module 220 monitors for characteristics of different surveillance events as defined by the security profile 250 in order to detect when a surveillance event occurs. The surveillance system 170 can define surveillance events separately on a per-implementation basis according to available sensor inputs and/or according to particular preferences. In general, the security profile 250 indicates different sensor inputs or combinations of sensor inputs that correlate with the surveillance events and are thus considered to justify further investigation and response.

As one example, the surveillance system 170 defines the security profile 250 to indicate which sensor inputs, combinations of sensor inputs, and/or intensities of signals from the sensors constitute the surveillance events. The sensor inputs can include inputs from, for example, motion sensors, perimeter/proximity sensors, shock sensors, audio sensors/voice recognition, ignition/key sensors including cryptographic key verification components, GPS sensors, and so on. In one embodiment, the monitoring module 220 can discriminate between intensities of signals from a sensor. That is, for example, a particular sensor may provide a stronger signal according to an extent of an input. Thus, as one example, when an object lightly brushes the vehicle, the sensor may provide a short duration signal, whereas when an object strongly impacts or continues to rest against the vehicle the sensor provides a stronger more intense signal. Thus, the monitoring module 220 can monitor for an activating input from the sensors that correlates with the noted surveillance events as defined by the security profile 250.

Moreover, while sensors of the sensors system 120 are generally discussed in relation to the vehicle 100, in one embodiment, the sensors can also include sensors of nearby sources that are either static or mobile. The nearby sources can be other vehicles, nearby fixed security systems, mobile phones, and other suitable devices that form a wireless communication network with the surveillance system 170. The wireless communication network can be an ad-hoc wireless network, a vehicle-to-vehicle (V2V) network, a cellular communication network, or another mode of communicating that is suitable for providing sensor information and/or detection notices between the surveillance system 170 and the nearby sources. Thus, in one embodiment, the surveillance system 170 can be a member of a localized security network that operates to share information detected using onboard sensors. In either case, the monitoring module 220 continuously monitors for the activating inputs of the sensors that are associated with the surveillance events.

At 320, the monitoring module 220 collects information from one or more sensors of the vehicle 100 about the surveillance event. In one embodiment, the monitoring module 220 collects information from a point when the surveillance event occurred and, for example, in an on-going manner after the surveillance event. Thus, the monitoring module 220 collects data upon the occurrence of the surveillance event by activating the cameras 126 within the vehicle 100 to acquire images, by recording audio, by activating a LIDAR 124, a radar 123, by logging whether one or more doors of the vehicle 100 are opened, by logging dynamics data and other vehicle data from the vehicle systems 140, and/or by obtaining any other information from the vehicle 100 that is pertinent to further assessing the surveillance event.

Additionally, as a further example, the monitoring module 220 collects the information from an ignition key of the vehicle 100 by sniffing communications between the vehicle 100 and the key to obtain, for example, a media access control (MAC) address of the key. Thus, the response module 230 can thereafter verify that key as authentic or not by comparing the MAC address against a stored table of valid keys. Additionally, the monitoring module 220 can obtain images from cameras both inside and outside of the vehicle 100, door sensors, and so on.

In one embodiment, the monitoring module 220 collects images from the cameras 126 and tracks an object as the object moves around or within the vehicle 100. The monitoring module 220 can also track the object between fields-of-view of different ones of the cameras 126 to provide a contiguous image/video once the object is detected. Thus, the response module 230, in one embodiment, can provide the acquired video/images of the object to a remote device in real-time so that, for example, a further determination about the response can be provided through communications with the remote device.

Figure 4:
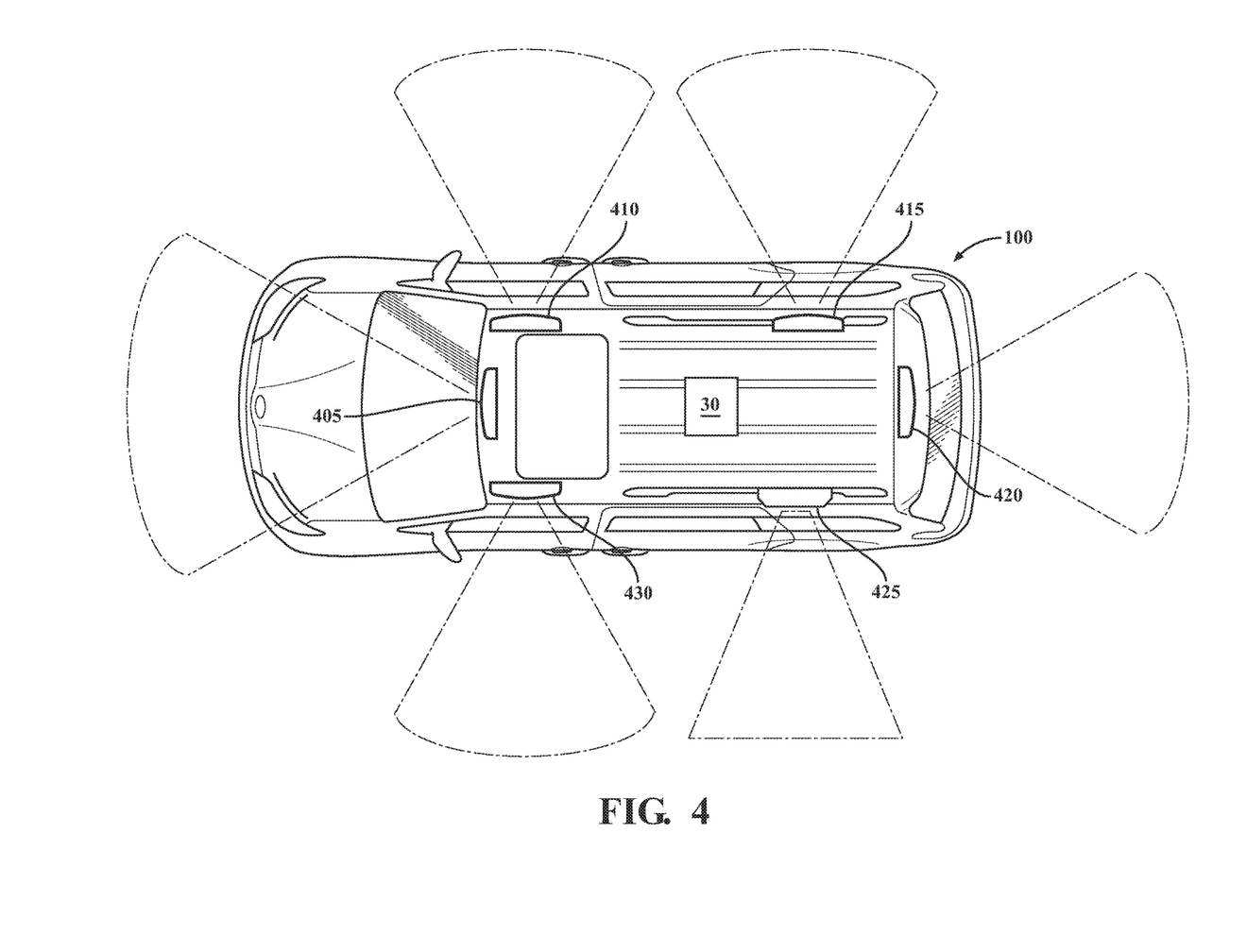
FIG. 4 illustrates a top-view of a vehicle that is equipped with various sensors including cameras for monitoring and gathering information about surveillance events that occur near the vehicle.

With reference to FIG. 4, a top-view of the vehicle 100 is illustrated. In FIG. 4 the vehicle 100 is illustrated as including six cameras 405, 410, 415, 420, 425, and 430 that are externally mounted and each include a separate field-of-view. The separate views for the cameras 405, 410, 415, 420, 425, and 430 can overlap in order to provide a continuous view of the surroundings of the vehicle 100. Accordingly, the monitoring module 220 and the response module 230 can use images from the cameras 405, 410, 415, 420, 425, and 430 to track objects moving around the vehicle 100. Furthermore, it should be appreciated that while the cameras 405, 410, 415, 420, 425, and 430 are illustrated and generally discussed in the illustrated configuration, the vehicle 100 may include fewer or more cameras than shown and in different configurations (e.g., within side-view mirrors, etc.). Additionally, in one embodiment, the vehicle 100 also includes one or more interior cameras. The interior cameras may be located within a rear-view mirror, within a headliner or in a suitable location for providing various interior views of the vehicle 100. In one example, the vehicle 100 includes driver monitoring cameras, and passenger monitoring cameras throughout the interior passenger compartment of the vehicle 100. As an additional matter, the cameras 126 themselves generally operate in a visible wavelength of light but may also, or alternatively, operate in infrared, ultraviolet or other suitable portions of the electromagnetic spectrum.

Moreover, in one embodiment, the monitoring module 220 is configured to collect information by wirelessly querying nearby sources for the information. Thus, once the monitoring module 220 detects the surveillance event, the monitoring module 220 can transmit an alert or beacon wirelessly over a communication network to query the nearby sources for information that may be relevant to the surveillance event. Accordingly, the monitoring module 220 can cause the nearby sources to transmit information back to the vehicle 100 that is then logged and included with the collected information at 320.

At 330, the response module 230 classifies the information to identify a threat type. In one embodiment, the threat type generally indicates at least a type of the object(s) that caused the surveillance event. The type of the object can be classified according to general categories defined by the security profile 250 such as a vehicle, person, animal, an inanimate object (e.g., ball, debris, etc.). Thus, the response module 230 loads the images obtained at 320 into, for example, the memory 210 or another working memory and analyzes the images using one or more object recognition techniques. In one embodiment, the response module 230 can select between different object recognition techniques according to environmental conditions indicated in obtained images and/or according to different scenes and lighting conditions. In either case, the response module 230 can implement techniques, such as motion analysis and tracking, shape recognition, pattern recognition, optical character recognition (OCR), or other suitable visual perception/processing techniques to detect and identify the objects.

Alternatively, or, in addition to categorizing the objects according to the general categories, in one embodiment, the response module 230 can use various image recognition techniques to identify a particular person (e.g., the driver and/or regular passengers) that has previously registered with the vehicle 100, to identify particular vehicles (e.g., other vehicles owned by the driver or commonly encountered), and so on. Moreover, the response module 230 can also identify characteristics of the object(s) including an orientation of the object, whether the object is moving, a direction of movement, a pose of the object, whether a person is, for example, holding another object (e.g., crowbar, knife, etc.), and so on.

Figure 5:
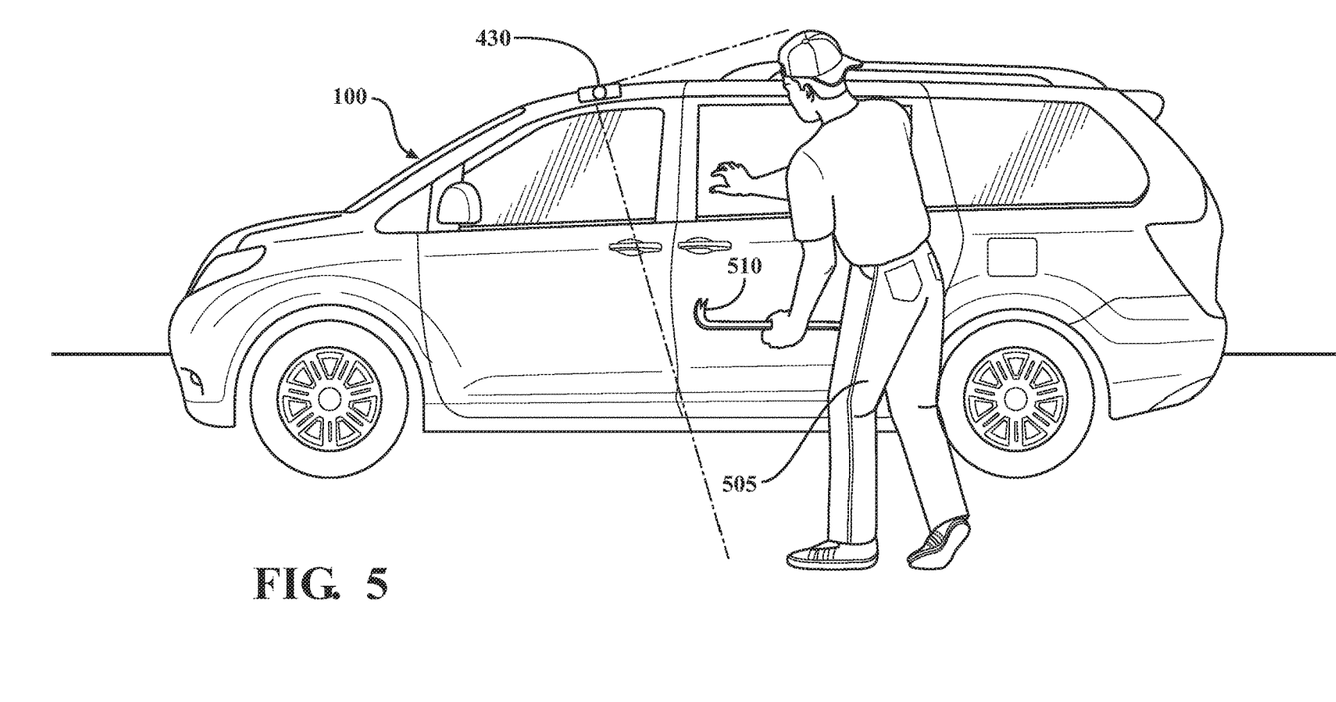
FIG. 5 illustrates a side-view of the vehicle of FIG. 4 including an example object that is proximate to the vehicle.

Accordingly, the response module 230 can analyze images from the cameras 126 to classify the threat type and thus further assess the surveillance event. As one example, FIG. 5 illustrates a side-view of the vehicle 100 with an object 505 approaching the vehicle 100. Thus, as a general example, the monitoring module 220 initially detects a presence of the object 505 when the object approaches within a certain distance to the vehicle 100. Thus, the monitoring module 220 receives a signal from a shock sensor and/or proximity sensor alerting about the presence of the object 505. However, all that is known by the surveillance system 170 initially is that the object 505 is present.

Accordingly, the monitoring module 220 proceeds to activate the camera 430 and obtain images of the object 505 in order to collect further information about the surveillance event. In one embodiment, the monitoring module 220 activates the camera 430 along with all the cameras 126 of the vehicle 100 and then analyzes the images to locate the object. Alternatively, the monitoring module 220 can selectively activate cameras according to a direction in which the object 505 is likely located as specified by the activating sensor input. In either case, once the monitoring module 220 collects the additional information, the response module 230 analyzes the information (e.g., the images) to identify a threat type.

In the instant example, the response module 230 analyzes images including the object 505. Thus, by applying one or more object recognition techniques, the response module 230 is able to identify the object 505 as a person. Moreover, in one embodiment, the response module 230 identifies that the person is carrying a second object 510 that is identified as a crowbar or as a potential weapon. Thus, beyond simply identifying the person 505, the response module 230 can identify further aspects of the object 505. In one embodiment, the response module 230 can also identify whether a face of the person 505 is concealed, a posture/pose of the person 505, whether the person is carrying one or more other objects and types of those objects, a general state of dress (e.g., nude, lightly clothed, disguised, etc.).

In further implementations, the response module 230 can perform facial recognition on the person 505 to determine whether the person is known or not. In other words, if the person 505 is a driver or other individual that has previously been registered with the vehicle 100 via an image or biometric signature stored in the security profile 250, then the response module 230 can recognize the person 505 upon obtaining an image. Additionally, if the person is not identifiable by the response module 230, then the response module 230 can indicate that the person is unknown. In addition to identifying people, the response module 230, in one embodiment, can also identify other objects, such as vehicles, that have been previously registered via license plates or other identifying characteristics. In this way, the response module 230 provides for classifying the threat type using image/object recognition.

At 340, the response module 230 classifies a threat level of the surveillance event. In one embodiment, the response module 230 determines various characteristics of the object in combination with different sensors that have been activated in order to classify the threat level for the surveillance event. For example, the characteristics analyzed by the response module 230 can include a proximity of the object(s) to the vehicle 100, the threat type, a duration for which the object(s) are proximate to the vehicle 100, which sensors of the sensor system 120 are active or were activated previously (e.g., proximity sensor, window break sensor, etc.). The response module 230 analyzes the characteristics according to information that was collected, at 320, (i.e., whether information is available) and correlations between the different information as identified by the security profile 250.

Thus, by way of example, as shown in FIG. 5, the response module 230 considers the correlations between the proximity of the person 505, movement of the person 505 toward or around the vehicle 100, the duration of time the person 505 has been proximate to the vehicle 100, the threat type including that the object 510 is also present, activation of other sensors such as a shock sensor from the person 505 contacting the vehicle 100, and so on. This combination of circumstances leads the response module 230 to classify this particular threat as high. This is because the threat type is generally considered suspicious when the person is an unidentified adult and is carrying an additional object 510. Moreover, contact with the vehicle 100 also adds to this increase in threat level.

By contrast, however, if the person 505 were a child and not carrying the additional object 510, then the response module 230 may conclude that the threat level is marginal or low. The response module 230 generally references defined correlations in the security profile 250 to classify the threat level as indicated. Moreover, in one embodiment, the security profile 250 can be a neural network or other machine learning model that learns relationships between provided inputs in order to determine threat levels and to provide appropriate responses. Thus, in one embodiment, as additional surveillance events are logged, electronic inputs from one or more users may be used to assist with classifying the threat type and the threat level such that the response module 230 can further train the security profile 250. In either case, the response module 230 classifies the threat level according to the available information about the surveillance event and according to correlations defined by the security profile 250.

At 350, the response module 230 controls the vehicle 100 to provide a response to the surveillance event according to the threat type and the threat level. In one embodiment, the response module 230 determines the response from the security profile 250 as a function of the threat type and the threat level. For example, the response module 230 can use the threat type and threat level as an input to the security profile 250 and obtain a response as a result. Thus, the security profile 250 can function as a lookup table with values being the possible responses. Moreover, the security profile 250 can include the possible responses according to various function available for the vehicle 100, preferences programmed into the security profile 250, and so on. Thus, the responses are generally customizable according to a particular implementation.

In general, the responses include, for example, sounding an audible alarm, providing an image or video feed to a remote device (e.g., a smartphone or remote monitoring center), providing a user interface (e.g., web-based interface) to a remote device that is a query for additional inputs, logging data about the surveillance event, transmitting a communication to authorities (e.g., police) to alert the authorities, transmitting a beacon to nearby devices connected via the ad-hoc wireless network about the event, autonomously operating the vehicle 100 to drive away or to a pre-programmed location, and so on.

Figure 6:
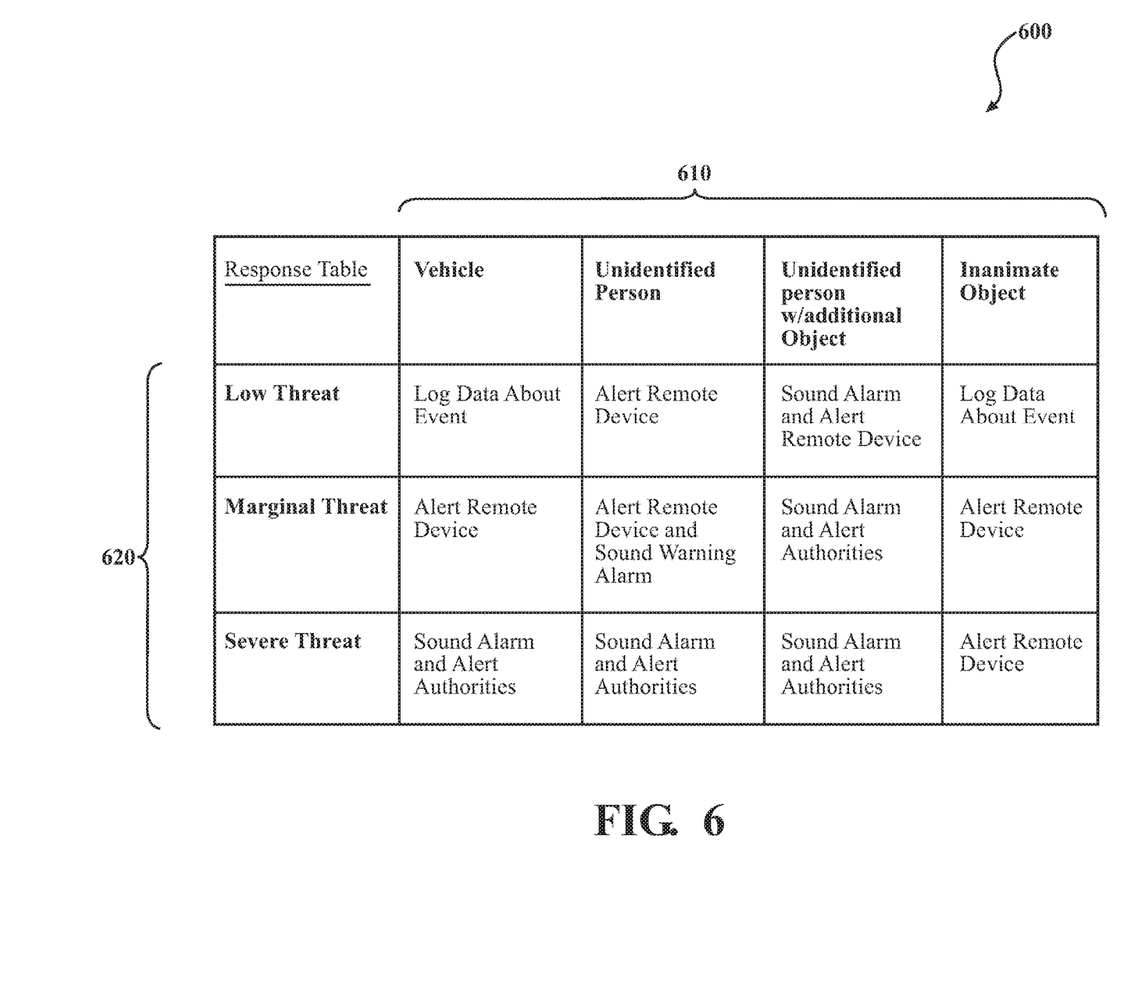
FIG. 6 illustrates a table depicting part of an example security profile.

As an example, FIG. 6 illustrates a response table 600 as can be implemented within the security profile 250. The response table 600 includes threat types 610 listed in the columns and threat levels 620 listed in the rows. Accordingly, correlations between the threat types and threat levels within cells of the table 600 indicate different responses and/or combinations of responses that correlate with the threat types and levels. While the provided types and levels are illustrated, in other embodiments, a different granularity of types and levels may be defined. Moreover, different tables may be implemented according to different characteristics. The table 600 is provided for purposes of illustration and should not be construed as a limitation on the variety of responses that may be provided by the surveillance system 170. As a further example, the response module 230 can transmit the noted user interface and/or components of the user interface (e.g., images from the cameras 126) to the remote device (e.g., smartphone of the driver) to inform the driver of a current status of the vehicle 100 and any ongoing surveillance events. In one embodiment, the response module 230 can include queries to the driver within the UI about what responses should be initiated for a surveillance event. If the response module 230 does not receive a response transmission indicating a response from the remote device, then a default response can be initiated.

In either case, the response module 230 can provide a wide range of responses depending on abilities of the vehicle 100. In this way, the surveillance system 170 can analyze information about a surveillance event in order to classify the information and provide a proportional response.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include data about roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data, e.g., data about a present context. "Driving environment data" includes data or information about the external environment/surroundings in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the surveillance system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the surveillance system 170, and/or the autonomous driving module(s) 160 may control some or all of these vehicle systems 140 and, thus, may be partially or fully autonomous.

The processor(s) 110, the surveillance system 170, and/or the autonomous driving module(s) 160 can be operatively connected to communicate with the various vehicle systems 140 and/or individual components thereof. For example, returning to FIG. 1, the processor(s) 110, the surveillance system 170, and/or the autonomous driving module(s) 160 can be in communication to send and/or receive information from the various vehicle systems 140 to control the movement, speed, maneuvering, heading, direction, etc. of the vehicle 100. The processor(s) 110, the surveillance system 170, and/or the autonomous driving module(s) 160 may control some or all of these vehicle systems 140.

The processor(s) 110, the surveillance system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the surveillance system 170, and/or the autonomous driving module(s) 160 can control the direction and/or speed of the vehicle 100. The processor(s) 110, the surveillance system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160, in one embodiment, operates in conjunction with the surveillance system 170. Alternatively, in one embodiment, the autonomous driving module 160 is embodied within the surveillance system 170 as part of the monitoring module 220 and/or the response module 230. In either case, the autonomous driving module 160 may receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the surveillance system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, a distributed memory, a cloud-based memory, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A surveillance system for providing security for a vehicle, comprising:
one or more processors;
a memory communicably coupled to the one or more processors and storing:
a monitoring module including instructions that when executed by the one or more processors cause the one or more processors to, in response to detecting a surveillance event associated with the vehicle, collect information including one or more images from one or more sensors of the vehicle and one or more nearby sources about the surveillance event, wherein the monitoring module includes instructions to collect the information including instructions to acquire at least a portion of the information including the one or more images by wirelessly querying the one or more nearby sources; and
a response module including instructions that when executed by the one or more processors cause the one or more processors to classify the information according to a security profile to identify a threat type and a threat level of the surveillance event, wherein the response module includes instructions to identify the threat type and the threat level including instructions to (i) identify, using image recognition to analyze the one or more images of one or more objects, a type of the one or more objects that are proximate to the vehicle, and (ii) identify threat characteristics of the one or more objects indicative of the threat level, wherein the instructions to identify the threat characteristics include instructions to identify a pose of a person in relation to the vehicle, a biometric signature of the person, and a presence of secondary objects held by the person, and wherein the response module includes instructions to control the vehicle to provide a response to the surveillance event according to the threat type and the threat level.

2. The surveillance system of claim 1, wherein the monitoring module further includes instructions to detect the surveillance event by monitoring the one or more sensors to detect an activating input associated with the surveillance event including monitoring a stream of data from the one or more sensors, and wherein the activating input is defined according to the security profile to include one or more signals from the one or more sensors that are indicative of the surveillance event.

3. The surveillance system of claim 1, wherein the monitoring module further includes instructions to collect the information by acquiring the one or more images from one or more cameras of the vehicle including activating the one or more cameras to provide the one or more images of a surrounding environment of the vehicle, and wherein the monitoring module further includes instructions to analyze the one or more images to identify the one or more objects in the one or more images associated with the surveillance event and to track the one or more objects while the one or more objects move across separate fields-of-view for the one or more cameras.

4. The surveillance system of claim 1,
wherein the response module further includes instructions to classify the information to identify the threat level by assessing the threat characteristics of the surveillance event according to the security profile, and wherein the threat characteristics include at least (i) a proximity of the one or more objects to the vehicle, (ii) the threat type, and (iii) a duration for which the one or more objects is proximate to the vehicle,
wherein the threat type accounts for attributes of the person including the pose in relation to the vehicle, the presence of secondary objects held by the person, a stature of the person, and the biometric signature.

5. The surveillance system of claim 1, wherein the monitoring module further includes instructions to detect the surveillance event by receiving a wireless signal from the one or more nearby sources including a nearby security system indicating an occurrence of the surveillance event,
wherein the instructions to collect the information include instructions to wirelessly query the one or more nearby sources including instructions to transmit a wireless communication that is a beacon message to the one or more nearby sources in response to the surveillance event and requesting sensor data from sensors of the one or more nearby sources about the surveillance event, and wherein the instructions to transmit the wireless communication include instructions to transmit the beacon message as an ad-hoc communication directly to the one or more nearby sources.

6. The surveillance system of claim 1, wherein the security profile indicates different activating inputs from the one or more sensors that correlate with different types of surveillance events, wherein the security profile specifies correlations between threat levels and threat types for which different responses are to be provided by the vehicle,
wherein the threat type indicates a type of an object associated with the surveillance event, an orientation of the object, and a current speed of the object, and
wherein the type of the object specifies at least whether the object is a vehicle.

7. The surveillance system of claim 1, wherein the response module further includes instructions to control the vehicle to provide the response by determining the response from the security profile as a function of the threat type and the threat level,
wherein the response module further includes instructions to control the vehicle to provide the response by transmitting video to a remote device to query the remote device about whether to generate an alarm for the surveillance event when the threat type and the threat level indicate a marginal threat.

8. The surveillance system of claim 1, wherein the response module further includes instructions to control the vehicle to provide the response by generating an alarm when the threat type and the threat level indicate a severe threat, and wherein the response module further includes instructions to control the vehicle to provide the response by logging the information for the surveillance event when the threat type and the threat level indicate a low threat.

9. A non-transitory computer-readable medium storing instructions that when executed by one or more processors cause the one or more processors to:
in response to detecting a surveillance event associated with a vehicle, collect information from one or more sensors of the vehicle and one or more nearby sources about the surveillance event, wherein the instructions to collect the information including instructions to acquire at least a portion of the information including one or more images by wirelessly querying the one or more nearby sources,
classify the information according to a security profile to identify a threat type and a threat level of the surveillance event including instructions to (i) identify, using image recognition to analyze the one or more images of one or more objects, a type of the one or more objects that are proximate to the vehicle, and (ii) identify threat characteristics of the one or more objects indicative of the threat level, wherein identifying the threat characteristics includes identifying a pose of a person in relation to the vehicle, a biometric signature of the person, and a presence of secondary objects held by the person, and
control the vehicle to provide a response to the surveillance event according to the threat type and the threat level.

10. The non-transitory computer-readable medium of claim 9, wherein the instructions to detect the surveillance event include instructions to monitor the one or more sensors to detect an activating input associated with the surveillance event including monitoring a stream of data from the one or more sensors, and wherein the activating input is defined according to the security profile to include one or more signals from the one or more sensors that are indicative of the surveillance event.

11. The non-transitory computer-readable medium of claim 9, wherein the instructions to collect the information include instructions to acquire images from one or more cameras of the vehicle including activating the one or more cameras to provide the images of a surrounding environment of the vehicle, and wherein the instructions to analyze the images include instructions to identify an object in the images associated with the surveillance event and to track the object while the object moves across separate fields-of-view for the one or more cameras.

12. The non-transitory computer-readable medium of claim 9,
wherein the instructions to classify the information include instructions to identify the threat level by assessing the threat characteristics of the surveillance event according to the security profile, and wherein the threat characteristics include at least (i) a proximity of the one or more objects to the vehicle, (ii) the threat type, and (iii) a duration for which the one or more objects is proximate to the vehicle,
wherein the threat type accounts for attributes of the person including the pose in relation to the vehicle, the presence of secondary objects held by the person, a stature of the person, and the biometric signature.

13. The non-transitory computer-readable medium of claim 9, wherein the instructions to detect the surveillance event include instructions to receive a wireless signal from a nearby security system indicating an occurrence of the surveillance event,
wherein the instructions to collect the information include instructions to wirelessly query the one or more nearby sources including instructions to transmit a wireless communication that is a beacon message to the one or more nearby sources in response to the surveillance event and request sensor data from sensors of the one or more nearby sources about the surveillance event, and wherein the instructions to transmit the wireless communication include instructions to transmit the beacon message as an ad-hoc communication directly to the one or more nearby sources.

14. A method of providing security for a vehicle, comprising:
in response to detecting a surveillance event associated with the vehicle, collecting information from one or more sensors of the vehicle and one or more nearby sources about the surveillance event, wherein collecting the information including one or more images includes acquiring at least a portion of the information including the one or more images by wirelessly querying the one or more nearby sources;
classifying the information according to a security profile to identify a threat type and a threat level of the surveillance event including (i) identifying, using image recognition to analyze the one or more images of one or more objects, a type of the one or more objects that are proximate to the vehicle, and (ii) identifying threat characteristics of the one or more objects indicative of the threat level to the vehicle,
wherein identifying the threat characteristics includes identifying a pose of a person in relation to the vehicle, a biometric signature of the person, and a presence of secondary objects held by the person; and
controlling the vehicle to provide a response to the surveillance event according to the threat type and the threat level.

15. The method of claim 14, wherein detecting the surveillance event includes monitoring the one or more sensors to detect an activating input associated with the surveillance event by monitoring a stream of data from the one or more sensors, and wherein the activating input is defined according to the security profile to include one or more signals from the one or more sensors that are indicative of the surveillance event.

16. The method of claim 14, wherein collecting the information includes acquiring the one or more images from one or more cameras of the vehicle by activating the one or more cameras to provide the images of a surrounding environment of the vehicle, and
wherein acquiring the images includes analyzing the images to identify an object in the images associated with the surveillance event and tracking the object while the object moves across separate fields-of-view for the one or more cameras.

17. The method of claim 14, wherein classifying the information to identify the threat level includes assessing the threat characteristics of the surveillance event according to the security profile, wherein the threat characteristics include at least (i) a proximity of the one or more objects to the vehicle, (ii) the threat type, and (iii) a duration for which the one or more objects is proximate to the vehicle, and
wherein the threat type accounts for attributes of the person including the pose in relation to the vehicle, the presence of secondary objects held by the person, a stature of the person, and the biometric signature of the person.

18. The method of claim 14, wherein detecting the surveillance event includes receiving a wireless signal from a nearby security system indicating an occurrence of the surveillance event,
wherein wirelessly querying the one or more nearby sources includes transmitting a wireless communication that is a beacon message to the one or more nearby sources in response to the surveillance event and requesting sensor data from sensors of the one or more nearby sources about the surveillance event, and
wherein transmitting the wireless communication includes transmitting the beacon message as an ad-hoc communication directly to the one or more nearby sources.

19. The method of claim 15, wherein the security profile indicates different activating inputs from the one or more sensors that correlate with different types of surveillance events, wherein the security profile specifies correlations between threat levels and threat types for which different responses are to be provided by the vehicle,
wherein the threat type indicates a type of an object associated with the surveillance event, an orientation of the object, and a current speed of the object, and
wherein the type of the object specifies at least whether the object is a vehicle.

20. The method of claim 14, wherein controlling the vehicle to provide the response includes determining the response from the security profile as a function of the threat type and threat level,
wherein the response includes transmitting video to a remote device to query the remote device about whether to generate an alarm for the surveillance event when the threat type and the threat level indicate a marginal threat,
wherein the response includes generating an alarm when the threat type and the threat level indicate a severe threat, and wherein the response includes logging the information for the surveillance event when the threat type and the threat level indicate a low threat.

* * * * *